United States Patent [19]

Wolfe, Jr.

[11] Patent Number: 4,758,628

[45] Date of Patent: Jul. 19, 1988

[54] THERMOPLASTIC ELASTOMERIC BLENDS OF POLYETHYLENE AND POLYCHLOROPRENE GEL

[75] Inventor: James R. Wolfe, Jr., Wilmington, Del.

[73] Assignee: E. I. Du Pont de Nemours and Company, Wilmington, Del.

[21] Appl. No.: 56,898

[22] Filed: Jun. 3, 1987

[51] Int. Cl.$^4$ .................. C08L 11/00; C08L 11/02; C08L 23/04; C08L 23/18
[52] U.S. Cl. .................................................. 525/215
[58] Field of Search ........................................ 525/215

[56] References Cited

U.S. PATENT DOCUMENTS

| | | | |
|---|---|---|---|
| Re. 28,688 | 1/1976 | Cook | 525/104 |
| 3,933,754 | 1/1976 | Kitagawa et al. | 525/215 |
| 4,005,054 | 1/1977 | Bonnefon | 525/215 |
| 4,348,266 | 9/1982 | Coran et al. | 204/159.17 |
| 4,593,062 | 6/1986 | Puydak et al. | 525/215 |
| 4,607,074 | 8/1986 | Hazelton et al. | 525/215 |

*Primary Examiner*—Carman J. Seccuro

[57] ABSTRACT

A composition comprising a blend of about 70–20 weight percent crystalline polyethylene resin and 30–80 weight percent emulsion-derived polychloroprene gel is disclosed. The blend is prepared by blending the two materials at a temperature near to or above the melting point of the polyethylene.

8 Claims, No Drawings

THERMOPLASTIC ELASTOMERIC BLENDS OF POLYETHYLENE AND POLYCHLOROPRENE GEL

BACKGROUND OF THE INVENTION

1. Field of the Invention

The present invention relates to an elastomeric blend of crystalline polyethylene resin and latex-derived polychloroprene gel which is melt fabricable. The present process is simpler in that less steps are needed to make the product and irradiation facilities are not required. Since the present process does not react the polyethylene, a product exhibiting superior processibility is obtained.

2. Prior Art

U.S. Pat. No. 4,348,266 discloses irradiated blends of polyethylene and neoprene.

U.S. Pat. No. Re. 28,688 discloses articles composed of crosslinked polychloroprene having incorporated therein polyethylene. The compositions disclosed have heat-activated dimensional memory characteristics and are not thermoplastic elastomers.

SUMMARY OF THE INVENTION

The present invention is directed to an elastomeric thermoplastic composition having improved processibility and superior physical properties including good resistance to compression set, excellent tensile strength, a high percent elongation, good resistance to oil swell and the scrap material is reusable. More specifically this invention is directed to an elastomeric melt processible multi-phase thermoplastic composition comprising a blend of:

(A) 20-70 parts by weight of a crystalline polyolefin resin comprising polymerized monomer units of ethylene and 15 weight percent or less of higher alpha-olefins, (B) 80-30 parts by weight of a polychloroprene-gel rubber derived from an emulsion of polychloroprene-gel rubber.

DETAILED DESCRIPTION

The polychloroprene-gel polymer used in the present invention may either be homopolychloroprene or copolychloroprene which has been treated in the latex so as to cause it to become gelled while in the latex form, or it may be a copolymer of chloroprene with a polyfunctional monomer capable of forming branches during the polymerization so as to directly produce a gel polymer during the polymerization. The copolychloroprene polymers contain at least 50% by weight of chloroprene which is the accepted name of 2-chloro-1,3-butadiene. The polychloroprene or copolychloroprene gel polymers suitable for use herein are distinguished from other polychloroprenes by being substantially insoluble in benzene, a solvent for polychloroprene.

The polychloroprene gel polymer latex can be prepared directly by copolymerizing the chloroprene monomer with one or more polyfunctional monomers which cause chain branching leading to gel formation. Examples of monomers which will cause chain-branching leading to gelation when copolymerized with polychloroprene are polyfunctional esters and amides of acrylic and methacrylic acid such as ethylene dimethacrylate, 1,6-hexamethylene diacrylate, ethylene diacrylate, 1,6-hexamethylenebisacrylamide, pentaerythritol tetramethacrylate, and tetramethylene diacrylate. Sufficient polyfunctional comonomer should be present such that the resulting polychloroprene copolymer after recovery from the latex is substantially insoluble in benzene. Alternatively, the polychloroprene gel polymer can be prepared in a stepwise fashion by first polymerizing the chloroprene monomer in the presence of a dialkyl xanthogen disulfide and then treating the resulting latex with amines to form a latex of benzene insoluble gel polymer as described in U.S. Pat. Nos. 3,300,433; 3,317,451; and 3,392,134. For purposes of the subject invention, the polychloroprene elastomer component of the compositions needs to be gelled so that not more than 45% by weight of the elastomer is extractable with benzene at 25° C. Thus the polychloroprene has a gel content of at least 55% by weight.

The chloroprene polymers latex may be prepared by emulsion polymerization of chloroprene, or a mixture of monomers consisting of chloroprene and up to 50% by weight based on total weight of the monomers, of one or more ethylenically unsaturated monomers copolymerizable therewith, by well-known methods. See, for example, the following U.S. Pat. Nos.: 2,576,009; 2,831,842; 2,914,497.

Examples of ethylenically unsaturated monomers copolymerizable with chloroprene are:
vinyl aromatic compounds such as styrene, the vinyl toluenes, and vinylnaphthalenes;
aliphatic conjugated diolefinic compounds, such as 1,3-butadiene, isoprene, 2,3-dimethyl-1,3-butadiene, and 2,3-dichloro-1,3-butadiene;
vinyl ethers, esters, and ketones, such as methyl vinyl ether, vinyl acetate, and methyl vinyl ketone;
esters, amides and nitriles of acrylic and methacrylic acid, such as ethyl acrylate, methyl methacrylate, methacrylamide, and acrylonitrile.

Any of the conventional emulsifying agents may be used in making the monomer emulsion. These include the water-soluble salts, particularly the sodium, potassium or ammonium salts, of compounds of the following types: long-chain fatty acids; rosins and rosin derivatives such as wood rosin, tall oil rosin, disproportionated rosin, or partially polymerized rosin; higher alcohol sulfates; aryl sulfonic acids, such as nonylbenzene sulfonic acid; and formaldehyde condensates of aryl sulfonic acids such as the condensation product of formaldehyde and naphthalene-sulfonic acid.

The conventional free-radical type polymerization initiators are used, which are compounds capable of yielding free radicals in the polymerization system. These include, for example, compounds containing the peroxy radical. Examples of these are hydrogen peroxide, cumene hydroperoxide, and water-soluble salts of persulfuric acid such as sodium persulfate, potassium persulfate, and ammonium persulfate. Other types of free-radical polymerization initiators which may be used are the azo compounds disclosed in U.S. Pat. No. 2,471,959, such as 2,2'-azobis(2-methylpropionitrile). Still others are the nitrogen fluorides or the sodium, potassium, or ammonium ferricyanides. In carrying out the polymerization, an aqueous solution of the polymerization initiator is usually added to the polymerization system at such a rate that the desired rate of polymerization is maintained. Rate of polymerization is usually determined by measuring the specific gravity of the emulsion during the polymerization.

The polymerization may be carried out between 0° C. and 60° C., preferably between 40° C. and 58° C.

The pH of the polymerization system may be slightly acidic, neutral, or in the alkaline range. It is preferred to conduct the polymerization at a pH ranging from 7 to 13.5.

Polymerization may be stopped by the addition of conventional "short-stopping" agents, such as a mixture of phenothazine and 4-tert-butylcatechol, as described in U.S. Pat. No. 2,576,009. Excess monomer, if present, may be removed by steam stripping as disclosed in U.S. Pat. No. 2,467,769.

As usual in chloroprene polymerizations, oxygen is excluded from the atmosphere in the polymerization vessel. This is conveniently done by sweeping the reaction vessel with a stream of an inert gas such as nitrogen and maintaining the atmosphere of the gas above the polymerization medium.

The polymer content of the final latex is not critical but usually ranges from about 35 to about 55 percent of the weight of the polymerization system.

The polyethylene used in the present invention is crystalline, with a density of from 0.91–0.97 g/cc and a melt index of from 0.07–80 g/10 minutes as measured at 190° C. The term "polyethylene" as used herein is intended to include in addition to the homopolymer those polymers that also contain minor amounts, usually not greater than 15 weight percent, of high alpha-olefins, e.g., butene, octene, etc. The polyethylene is present as a continuous phase which makes the composition thermoplastic while still retaining the elastomeric properties of the polychloroprene.

The mixing of the polychloroprene and polyethylene is done at a temperature which is at or above the melting point of the polyethylene. Generally this will mean that the mixing takes place at 110°–220° C.

The polychloroprene-gel polymer in amounts of about 30-80 parts by weight total polymers are blended with about 70-20 parts by weight total polymers of polyethylene, preferably 40-70 parts polychloroprene-gel polymer by weight total polymers are blended with about 60-30 parts polyethylene by weight total polymers.

The mixing of the polychloroprene-gel polymer with polyethylene is accomplished by any one of a number of conventional techniques, for example, in a Banbury mixer, two-roll mill, or extruder. This mixing is done at a temperature high enough to soften the polymers for adequate mixing, but not so high as to degrade the polychloroprene-gel polymer. Generally, mixing is done at a temperature range from about 100°–220° C., preferably 120°–190° C. Mixing is carried out for a time sufficient to allow for shearing and dispersing the polychloroprene-gel polymer substantially uniformly throughout the polyethylene.

Although not essential components of the composition of this invention, preferably, especially from a cost standpoint, various amounts of any number of conventional fillers or compounding ingredients normally used with elastomers may be admixed with the compositions of this invention. Examples of such ingredients include extending oils; fillers such as various carbon blacks, clays, silica, alumina, calcium carbonate; pigments such as titanium dioxide; antioxidants; antidegradants; tackifiers; processing aids such as lubricants and waxes; and plasticizers such as dialkylphthalates, trialkylmellitates and polyester oligomers. It is preferred to add processing oils and fillers to the thermoplastic composition to improve its processing characteristics and the amounts used depend, at least in part, upon the quantities of other ingredients in the composition and the properties desired from the composition.

The compositions of the subject invention are melt processible using conventional plastic processing equipment. Articles molded from the thermoplastic elastomeric compositions of the present invention exhibit properties generally only associated with vulcanized rubber. For example, these compositions have resistance to compression set values of about 15 to 66 percent (at 70° C.); and elongation at break values of about 100 to 400 percent. Various uses for the thermoplastic elastomer compositions include wire coverings, seals and gaskets, automotive parts, sheet liners and packaging films. They can be used to coat fabric, industrial belts, and various hard surfaces by extrusion coating, for example, on substrates made from polyester, polyamide, polyimide, or metal fibre or fabric reinforcement. They find utility in adhesive and sealant applications, as well as for modification of other polymer systems.

Further, thermoplastic elastomeric compositions within the scope of this invention can be fabricated into tubing for laboratory, medical, and industrial uses. Such tubing can also be used as the inner tube of reinforced hoses, wherein the extruded tube is overlaid with wire or textile cords, applied as a spiral, knit, or braid. Optionally, a polymeric covering may be applied (extruded or spiral wound calendered sheet) over the reinforced tubing to provide protection from the working environment and mechanical abuse. Compositions within the scope of this invention can be used as the protective covering of reinforced tubes of similar or different composition.

EXAMPLES

A polychloroprene gel-polymer latex was prepared by free-radical emulsion copolymerization to 97% conversion of a mixture of 96 parts of 2-chloro-1,3-butadiene and 4 parts of ethylene dimethacrylate in the presence of 0.23 part of n-dodecyl mercaptan. The polychloroprene gel polymer was recovered from the latex by freezing, washing, and drying. This gel polymer was used in Examples 1G to 6G.

The polychloroprene sol polymer used in the comparative examples is commercially available as Neoprene W polychloroprene. The crystalline polyethylene resin used in the examples has a density of 0.958, a melt index of 7.2, and is commercially available as Alathon ® 7036 polyethylene resin.

Except for Example 4X, the polymers reported in Table 1 were charged in the relative amounts reported in the Table to a Haake Rheocord Torque Rheometer (Rheocord Model 600) equipped with cam-style blades and preheated to 160° C. Mixer speed was maintained at 100 rpm during the mixing procedure. The polymers were mixed until their temperature reached 160° C. and then for 10 minutes thereafter. The temperature of the mixtures rose above 160° C. during the mixing procedure. A nitrogen atmosphere was maintained in the mixing chamber while the polymers were being mixed. The polymer mixtures were removed from the Haake mixer and milled for about 3 minutes on a hot 2-roll rubber mill until being returned to the Haake mixer for a 2 minute remix at 160° C.

Also shown in Table 1 for comparison purposes is a composition prepared by mixing polyethylene with polychloroprene sol polymer in the presence of crosslinking agents for the polychloroprene sol polymer, composition 4X. Composition 4X was prepared by mixing the polyethylene and the polychloroprene sol polymer in the Haake mixer for 4 minutes at 160° C., adding per 100 parts of total polymer mixture 5 parts of magnesium oxide plus 4 parts of zinc oxide and 2 parts of 75 weight percent ethylene thiourea dispersion in an ethylene/propylene/diene terpolymer binder, mixing for 7 minutes at 160° C., milling on a rubber mill, and then remixing in the Haake mixer for 2 minutes as described above. Composition 4X is not part of the present invention and is included for comparison purposes only. Composition 4G which is illustrative of the present invention excels relative to composition 4X in resistance to compression set, in tensile strength, and in elongation to break.

Test samples were compression molded at 195°–200° C. to form slabs about 2 mm thick and about 0.6 mm thick. Test specimens were cut from the slabs. The test methods used were:

| | |
|---|---|
| tensile strength at break at 8.5 mm/s | ASTM D412, die c |
| elongation at break at 8.5 mm/s | ASTM D412, die c |
| compression set after 22 hr/70° C., method B | ASTM D395 |
| volume swell in ASTM #3 oil | ASTM D471 |

Stress-strain measurements were run on test specimens approximately 0.6 mm in thickness. Specimens for oil-swell tests were cut from 2 mm thick slabs which were remolded from previously molded slabs in order to demonstrate the remoldability of the blends. Compression sets were measured using 13 mm diameter discs diced out of about 2 mm thick slabs and piled up to a thickness of about 13 mm.

Shown in Table 1 are a series of compositions prepared as described above and ranging from 70 parts polyethylene and 30 parts polychloroprene gel polymer to 20 parts polyethylene and 80 parts polychloroprene gel polymers. The compositions are labeled 1G to 6G. Compositions 1G to 6G are illustrative of the present invention.

Shown in Table 1 for comparison purposes are the properties of compositions prepared by mixing polyethylene with polychloroprene sol polymer, compositions 1S to 6S, using the mixing procedures described for the compositions containing polychloroprene gel polymer. Compositions 1S to 6S are not part of the present invention and are included for comparison purposes only. Compositions 1G to 6G which are illustrative of the present invention excel relative to compositions 1S to 6S in resistance to compression set, in resistance to oil swell, and in elasticity as indicated by their greater elongations at break.

TABLE 1

| Composition | Polyethylene (wt %) | Polychloroprene (wt %) | Type | Comp. Set B 22 Hr./70° C. % | ASTM #3 oil 7 days/70° C. (% Vol. Swell) | Tensile Strength (MPa) | Elongation At Break (%) |
|---|---|---|---|---|---|---|---|
| 1G | 70 | 30 | gel | 66 | 17 | 14 | 110 |
| 1S | 70 | 30 | sol | 74 | 23 | 16 | 35 |
| 2G | 60 | 40 | gel | 56 | 22 | 12 | 210 |
| 2S | 60 | 40 | sol | 72 | 33 | 12 | 55 |
| 3G | 50 | 50 | gel | 49 | 28 | 12 | 330 |
| 3S | 50 | 50 | sol | 76 | 44 | 10 | 95 |
| 4G | 40 | 60 | gel | 49 | 36 | 11 | 330 |
| 4S | 40 | 60 | sol | 85 | 58 | 8.7 | 130 |
| 4X | 40 | 60 | sol-crosslinked | 51 | 35 | 9.4 | 135 |
| 5G | 30 | 70 | gel | 24 | 45 | 10 | 380 |
| 5S | 30 | 70 | sol | 78 | 77 | 7.0 | 120 |
| 6G | 20 | 80 | gel | 17 | 56 | 8.6 | 300 |
| 6S | 20 | 80 | sol | 61 | 92 | 6.6 | 130 |

COMPARATIVE EXAMPLES 7 TO 13

A series of compositions were prepared from polyethylene, polychloroprene sol polymer, and for some compositions trimethylol propane triacrylate. The compositions and their ingredients are listed in Table 2 as compositions 7–13. Compositions 7–13 are not part of the present invention and are present only for comparative purposes. Compositions 7–13 were prepared according to the procedure of U.S. Pat. No. 4,348,266. Compositions 7–13 were prepared by mixing equal portions of crystalline polyethylene and polychloroprene sol polymer in the Haake mixer along with the relative amount of trimethylol propane triacrylate indicated in Table 2. The compositions were mixed for 3 minutes at 190° C., removed from the Haake mixer, then reinserted in the mixer and remixed for 2 minutes at 190° C. The compositions were removed and pressed into slabs having the dimension 76 mm × 152 mm × 3.3 mm. The slabs were irradiated at the indicated dosages using a 3 Mev 1 ma Van de Graaf accelerator. The resulting compositions were mixed in the Haake mixer as described above and then compression molded at 225° C. The properties of compositions 7–13, which are not representative of the present invention, are shown in Table 2 in comparison to composition 3G prepared from equal amounts of polychloroprene gel polymer and polyethylene as described previously. Composition 3G is representative of the present invention. Composition 3G excels in resistance to compression set relative to compositions 7–13 and is comparable in other properties. Composition 3G is also much more easily prepared then compositions 8–13 requiring many fewer steps in preparation.

TABLE 2

| | 3G | 7 | 8 | 9 | 10 | 11 | 12 | 13 |
|---|---|---|---|---|---|---|---|---|
| Composition | | | | | | | | |
| Polyethylene | 50 | 50 | 50 | 50 | 50 | 49 | 48.1 | 46.3 |
| Polychloroprene gel polymer | 50 | — | — | — | — | — | — | — |
| Polychloroprene sol polymer | — | 50 | 50 | 50 | 50 | 49 | 48.1 | 46.3 |
| Trimethylol propane triacrylate | — | — | — | — | — | 2 | 3.8 | 7.4 |
| Irradiation | 0 | 0 | 1 | 5 | 10 | 1 | 1 | 1 |

TABLE 2-continued

| | 3G | 7 | 8 | 9 | 10 | 11 | 12 | 13 |
|---|---|---|---|---|---|---|---|---|
| dose, MR Properties | | | | | | | | |
| Comp. Set B 22 Hr./ 70° C., % | 49 | 61 | 60 | 55 | 57 | 56 | 52 | 51 |
| ASTM #3 Oil 7 days/ 70° C., % vol swell | 28 | 35 | 30 | 24 | 35 | 26 | 25 | 23 |
| Tensile Strength, MPa | 12 | 9.1 | 10 | 12 | 13 | 12 | 13 | 13 |
| Elongation at Break, % | 330 | 93 | 191 | 391 | 212 | 397 | 452 | 333 |

EXAMPLE 14G

A polychloroprene gel polymer was prepared by free-radical emulsion copolymerization in the following manner. A solution of 96 parts chloroprene, 4 parts ethylene dimethacrylate, 3 parts disproportionated wood rosin, and 0.23 parts dodecanethiol was emulsified with a solution of 108.5 parts of demineralized and deaerated water, 0.7 parts of the sodium salt of a sulfonated naphthalene-formaldehyde condensate, 0.3 parts of sodium sulfite, and 0.67 parts of sodium hydroxide. Catalyst consisting of an aqueous solution of potassium persulfate and the sodium salt of anthraquinone-2-sulfonic acid was added to cause polymerization. The polymerization was carried out at a temperature of 40°-54° C. Upon completion of polymerization, the resulting latex was stabilized with an emulsified mixture of toluene, 4-tert-butylcatechol, phenothiazine, distilled water, sodium lauryl sulfate, and the sodium salt of a sulfonated naphthalene-formaldehyde condensate. The polychloroprene gel copolymer was recovered from the latex by freeze coagulation, washed with water, and dried at 50° C. under reduced pressure to constant weight. The polychloroprene gel polymer was mixed with polyethylene in equal amounts by weight according to the procedure described for composition 3G in order to form composition 14G. After molding, composition 14G had a compression set of 49%, oil swell of 28%, tensile strength of 12 MPa, and elongation at break of 193%. Composition 14G is representative of the present invention.

Composition 14G and compositions 7 to 13 of Table 2 were extruded from an Instron Capillary Rheometer system Model 3211 using a capillary die having a 180 degree entrance angle, a capillary diameter of 0.025 inches, and a length of 1.1246 inches. The polymers were extruded at a shear rate of 2721 reciprocal seconds. Compositions 7 to 13, which are not representative of the present invention but which are present for comparative purposes, extruded in the form of rough-surfaced strands exhibiting the effects of substantial melt fracture. Composition 14G which is representative of the present invention did not exhibit pronounced melt fracture upon extrusion being substantially smooth except for a slight roughness on one side. A lower pressure was required to extrude composition 14G than compositions 7 to 13. The results indicate that composition 14G of the present invention is more processible than compositions 7 to 13.

I claim:

1. A non-irradiated composition comprising a binary polymer blend of about 70-20 parts by weight per 100 parts of polymer present of a crystalline polyethylene resin having a melt index of 0.07-80g/10 minutes as measured at 190° C. present as a continuous phase and 30-80 parts by weight per 100 parts of polymer present of a polychloroprene gel rubber containing at least 50% by weight polymerized chloroprene, said polychloroprene gel rubber being derived from an emulsion of polychloroprene gel rubber gelled to an extent that not more than about 45% by weight of said polychloroprene is extractable with benzene at 25° C.

2. The compositions of claim 1 wherein the polyethylene resin contains up to 15 weight percent of polymerized higher alpha-olefins containing up to 12 carbon atoms.

3. The composition of claim 1 wherein the polychloroprene gel rubber is prepared by copolymerizing the chloroprene monomer with chain-branching, polyfunctional monomers.

4. The composition of claim 1 comprising 60-30 parts by weight per 100 parts of polymer present of a crystalline polyethylene resin and 40-70 parts by weight per 100 parts polymer present of a polychloroprene gel rubber.

5. A process for preparing the composition of claim 1 in which polychloroprene gel rubber derived from an emulsion of polychloroprene gel rubber is mixed with polyethylene resin at a temperature near to or above the melting point of the polyethylene at a high shear rate so as to disperse the polychloroprene gel rubber in a continuous phase of polyethylene resin.

6. The process of claim 5 wherein the polyethylene resin contains up to 15 weight percent of polymerized higher alpha-olefins containing up to 12 carbon atoms.

7. The process of claim 5 wherein the polychloroprene gel rubber is prepared by copolymerizing the chloroprene monomer with chain-branching, polyfunctional monomers.

8. The process of claim 5 wherein 40-70 parts by weight per 100 parts of polymer present of a polychloroprene gel rubber are mixed with 60-30 parts by weight per 100 parts of polymer present of polyethylene resin.

* * * * *